(12) United States Patent
Messenger et al.

(10) Patent No.: US 7,993,483 B2
(45) Date of Patent: Aug. 9, 2011

(54) CORRUGATED PAPERBOARD AND ADHESIVE

(75) Inventors: Jimmie Franklin Messenger, Easley, SC (US); Shawn Messenger, Axtel, TX (US); Sharlan Wilkins, Easley, SC (US)

(73) Assignee: Oel Chemical & Supplies, Inc., Easley, SC (US)

( * ) Notice: Subject to any disclaimer, the term of this patent is extended or adjusted under 35 U.S.C. 154(b) by 672 days.

(21) Appl. No.: 12/150,540

(22) Filed: Apr. 29, 2008

(65) Prior Publication Data

US 2009/0266483 A1    Oct. 29, 2009

(51) Int. Cl.
| | |
|---|---|
| B32B 7/14 | (2006.01) |
| C04B 37/00 | (2006.01) |
| C08L 3/00 | (2006.01) |
| C09D 103/00 | (2006.01) |
| C09J 103/00 | (2006.01) |

(52) U.S. Cl. ............... 156/325; 156/291; 106/215.1

(58) Field of Classification Search .............. 156/291, 156/325; 106/215.1
See application file for complete search history.

(56) References Cited

U.S. PATENT DOCUMENTS

| | | | |
|---|---|---|---|
| 4,814,039 | A | 3/1989 | Willging |
| 5,093,393 | A | 3/1992 | Faber et al. |
| 5,405,437 | A | 4/1995 | Leake et al. |
| 5,503,668 | A | 4/1996 | Giesfeldt et al. |
| 6,056,816 | A | 5/2000 | Hagens et al. |
| 6,179,905 | B1 | 1/2001 | McPherson et al. |
| 6,228,158 | B1 * | 5/2001 | Skuratowicz ............ 106/208.1 |
| 6,287,412 | B1 | 9/2001 | Giesfeldt et al. |
| 6,368,443 | B1 | 4/2002 | Fitt et al. |
| 7,160,608 | B2 | 1/2007 | Yanagisawa et al. |
| 2006/0240219 | A1 * | 10/2006 | Skuratowicz et al. ........ 428/116 |
| 2007/0149657 | A1 | 6/2007 | Skuratowicz et al. |

* cited by examiner

*Primary Examiner* — Philip Tucker
*Assistant Examiner* — Michael Orlando
(74) *Attorney, Agent, or Firm* — McNair Law Firm, P.A.; Seann P. Lahey

(57) ABSTRACT

A cross-linked starch adhesive for use in producing moisture resistant wax free corrugated paperboard and the recyclable paperboard produced using the adhesive.

10 Claims, No Drawings

CORRUGATED PAPERBOARD AND ADHESIVE

FIELD OF THE INVENTION

This invention relates to an improved corrugated board product that retains strength under high moisture conditions without using a water-proofing coating and to the process for producing the corrugated paperboard. In particular, this invention relates to an adhesive composition for use in making the improved paperboard that may be recycled.

BACKGROUND OF THE INVENTION

In the past, in order to provide a water resistant paperboard it has been common practice to coat the paperboard with petroleum or vegetable based waxes or other coating products. These coatings, particularly the petroleum based products such as paraffin, present a disposal problem because burning them can create air pollution and, when buried in a landfill, they do not readily deteriorate. Accordingly, it is one object of the present invention to provide a moisture resistant paperboard which does not require the application of a coating.

In the process of manufacturing corrugated paperboard usually a strip of paperboard is corrugated by heated, fluted rolls. The protruding tips on one side of the fluted paperboard strip are coated with an adhesive after which a flat sheet of facing paperboard is positioned in contact with these tips. Heat and pressure are applied as the fluted strip and facing board are held together to complete the bond. A double-face paperboard can be made in which the flute tips on both sides of the corrugated strip are coated and the fluted strip is then sandwiched between two paperboard facing sheets.

The selection of an appropriate adhesive is important if the desirable properties of a paperboard product are to be achieved. Perhaps the most commonly used adhesives are the starch-based adhesives which are prepared in various cooking steps with caustic soda and Borax. The type of starch selected is also important and the high amylose starches are traditionally thought to be superior to the lower amylose starches such as pearl starches. To improve the performance of starch adhesives various additives have been employed including cross-linking agents, polyvinyl alcohols, formaldehydes, ketones and acetones. In U.S. Pat. No. 5,093,393 which issued to John A. Faber et al. on Mar. 3, 1992, the use of a controlled amount of polyvinyl alcohol in a pre-mix is described in which the PVA has an intermediate degree of hydrolysis. This pre-mix is used in making a corrugating adhesive comprising starch, alkali base, boric acid, and water. The composition is said to impart an increase in the rate of viscosity build up of the adhesive which increases the bond setting speed. Other prior art patents that describe the use of PVA in starch based adhesives are set forth in the aforementioned Faber et al. patent. In addition, patents such as U.S. Pat. No. 4,814,039 to Willging and U.S. Pat. No. 5,503,668 to Giesfeld et al. also describe PVA's use in a starch based adhesive. Accordingly, it is one object of the invention to provide a novel PVA composition and method of use that provides improved adhesive strength of a starch based adhesive.

While there may be some improvement in moisture resistance or wet strength by the prior art adhesives mentioned above, still the loss of strength under high moisture conditions continues to be a problem. Accordingly, another object of the present invention is to provide an adhesive formulation that provides improved strength in moisture conditions and better performance by corrugated containers.

These objects and others are achieved by the invention described below.

SUMMARY OF THE INVENTION

It has been surprisingly discovered that a uniquely prepared poly-vinyl alcohol and ketone-aldehyde resin additive composition ("PVA additive") which, in one aspect, when combined with an acid modified carrier starch with a crosslinking agent will provide a superior water resistant adhesive for producing a wax free corrugated paperboard when added to either a pearl starch and/or "a modified starch" (e.g., an acid modified thin starch) adhesive batch. In another aspect, the PVA additive may be combined directly in a conventional adhesive starch batch without the carrier starch.

In yet another aspect, the invention is a process which includes the foregoing additive in forming a strong, paperboard without a moisture proofing coating. The steps of the process include providing an adhesive composition which comprises the poly-vinyl alcohol and ketone-aldehyde resin additive and an acid modified carrier starch with soda and lime, and a crosslinking agent; blending and heating the foregoing components with a pearl starch to reach a gel composition in the temperature range of about 135° F. to 145° F., preferably about 142° F., and a preferable viscosity of about 50 seconds (Steinhall), applying the adhesive to form a glue line along the tips of the flutes of a corrugated paperboard strip, the glue line having a preferable width in the range of about 0.080" to about 0.140". The width of the glue line is important but may be in the lower portion of the range, e.g., 0.080" to 0.10" and; applying a flat sheet of paperboard under pressure at a temperature of in the range of about 210° F. to 240° F. preferably about 220° F. to contact the adhesive on the glue lines of the flutes thereby forming a high strength, moisture resistant paperboard product.

In a still further aspect, the present invention is a moisture resistant paperboard prepared with the foregoing described adhesive and process.

DETAILED DESCRIPTION

The preparation of the starch-based adhesive composition of the invention begins with the preparation of the novel additive of the invention. In a preferred embodiment and best mode of the invention, a poly-vinyl alcohol (PVA) having a molecular weight in the range of 11,000 to 31,000 is prepared by heating the PVA solution to around 200° F. for a period of about 60 minutes and then allowing it to cool to approximately 95° F. The heating range may be from about 180° F. to about 220° F. and the cooling range from 90° F. to about 100° F. A preferred poly-vinyl alcohol (PVA) is Hearst-Celanese 205, which is hydrolyzed to about 87% to 89%. The PVA content of the solution may range from about 20% to 50% or greater. Adhesive strength improves as the PVA percentage increase.

After cooling to about 95° F., ketone-aldehyde resin is added. Preferably the resin contains about 60% solids and a preferred commercially available resin is Hexion COL.

The resin and PVA are combined in about a 50/50 ratio by weight. In preparing a typical batch of the additive about 2500 pounds of resin and 2500 pounds of the prepared PVA is combined to form this "PVA additive".

Next, a modified starch is prepared which comprises a soda ash and lime modified carrier starch which is supplied as "Magnabond 2R" by Tate & Lyle. The modified starch is designated as "an acid modified carrier starch". (AMCS)

In the preparation of a final starch adhesive batch, about 3,000 pounds of starch is prepared which may be a pearl starch or a high amylose starch with soda and borax as is commonly known in the art, the use of pearl starch being more economical. About 17% by weight of a modified carrier starch (MCS) or about 500 lbs is combined in the pearl starch batch with about 2% by weight of the PVA additive, i.e., about 55 to 60 lbs. These constituents are blended until they reach gel condition at a temperature of at about 142° F. and a viscosity of about 50 seconds. (Steinhall) At this point, the final adhesive is ready to apply to the flutes of a corrugated paperboard strip.

The final adhesive is coated on the flutes of a corrugated strip in a glue line preferably with a width in the range of 0.120" to 0.140", although narrower widths may be used such as 0.080" to 0.100". Paper sheet heated to about 220° F. is applied under pressure to the coated flutes. A superior board results that resists moisture without a wax coating and has a stronger bond for constructing containers.

While a preferred embodiment of the invention has been described using specific terms, such description is for illustrative purposes only, and it is to be understood that changes and variations may be made without departing from the spirit or scope of the following claims.

What is claimed is:

1. A method of preparing starch based adhesive for producing wax free corrugated paperboard without moisture resistant coatings comprising the steps of:
   a) heating a solution of polyvinyl alcohol (PVA) hydrolyzed from about 87% to about 89% to a temperature in the range from about 180° F. to 220° F. and holding said solution at said temperature for at least about 60 minutes;
   b) cooling said solution of polyvinyl alcohol to a temperature in the range of about 90° F. to about 100° F.; and
   c) mixing said cooled PVA solution with about an equal amount by weight of a aldehyde ketone resin solution having solids in the range of about 50 to 70 wt % to produce a PVA additive composition; and,
   d) combining said PVA additive in a minor amount with an adhesive starch batch of a minor amount of modified starch and a major amount of pearl starch, wherein the combined said PVA additive and said adhesive starch batch is heated to a gel condition to produce an improved adhesive.

2. The method of claim 1 wherein the PVA solution is heated to about 200° F.

3. The method of claim 1 wherein the PVA solution is cooled to about 95 F.

4. The method of claim 1 wherein the solids content of the aldehyde-ketone resins is about 60%.

5. The method of claim 1 wherein said solution of polyvinyl alcohol includes a PVA content in the range from about 20% to about 50%.

6. The method of claim 1 wherein step (d) the starch batch is a blend of pearl starch and modified starch.

7. The product of the method of claim 1.

8. A method of making a moisture resistant paperboard without a moisture resistant coating comprising the steps of:
   a) providing a PVA additive comprising poly-vinyl alcohol hydrolyzed from about 87% to about 89% and ketone-aldehyde resin, wherein said poly-vinyl alcohol is heated to a temperature in the range from about 180° F. to 220° F. and held at said temperature for at least about 60 minutes, then cooled to a temperature in the ramie of about 90° F. to about 100° F. and mixed with said ketone-aldehyde;
   b) providing an acid modified carrier starch, and a cross-linking agent;
   c) blending the PVA additive, the carrier starch and the cross linking agent in a minor portion with a major portion of a pearl or modified starch and thereafter heating the blended composition to about 142° F. and a viscosity of about fifty seconds (Steinhall) to form an adhesive;
   d) applying the adhesive to form a glue line along tips of flutes of a corrugated paperboard strip, the glue line having a width in the range of about 0.080" to about 0.140" and;
   e) applying a flat sheet of paperboard under pressure at a temperature of about 220° F. to contact the adhesive on the flue lines on the flutes thereby forming the high strength, moisture resistant, paperboard product that is free of wax or other moisture resistant coatings.

9. The process of claim 8 wherein the PVA and aldehyde-ketone resin are combined in approximately equal parts by weight, the ketone-aldehyde resin having about 60% solids to provide the PVA additive, wherein the portion of said PVA additive included in said blended composition in step (c) is about 2% by weight.

10. The process of claim 8 wherein acid modified carrier starch is added to the starch to comprise about 17% by weight of the blend with starch to form a ready-to-apply adhesive.

* * * * *

UNITED STATES PATENT AND TRADEMARK OFFICE
CERTIFICATE OF CORRECTION

| | | |
|---|---|---|
| PATENT NO. | : 7,993,483 B2 | Page 1 of 1 |
| APPLICATION NO. | : 12/150540 | |
| DATED | : August 9, 2011 | |
| INVENTOR(S) | : Jimmie Franklin Messenger et al. | |

It is certified that error appears in the above-identified patent and that said Letters Patent is hereby corrected as shown below:

Face Page of Patent (73) after Assignee: should read:

--Cel Chemical & Supplies, Inc., Easley, SC (US).--

Signed and Sealed this
Eighteenth Day of October, 2011

David J. Kappos
*Director of the United States Patent and Trademark Office*